United States Patent

Demars et al.

[11] 3,928,745
[45] Dec. 23, 1975

[54] METHOD OF ELECTRIC WELDING BY TRANSFERRED PLASMA AND A WELDING TORCH FOR CARRYING SAID METHOD INTO EFFECT

[75] Inventors: Paul Demars, Hazebrouck; Francis Cuny, Mantes-la-Jolie; Joseph Garrigoux, Laxou; Christian Tassart, Brunoy, all of France

[73] Assignee: L'Air Liquide, Societe Anonyme pour l'Etude et l'Exploitation des Procedes Georges Claude, Paris, France

[22] Filed: June 26, 1973

[21] Appl. No.: 373,899

[30] Foreign Application Priority Data
July 3, 1972  France .............................. 72.23929

[52] U.S. Cl. ............................ 219/121 P; 313/231.3
[51] Int. Cl.² ........................................ B23K 5/00
[58] Field of Search .............. 219/121 P, 74, 75, 76, 219/130, 137; 313/231, 204

[56] References Cited
UNITED STATES PATENTS

| | | | |
|---|---|---|---|
| 2,862,099 | 11/1958 | Gage | 219/74 |
| 3,304,719 | 2/1967 | Ducati | 219/75 |
| 3,308,623 | 3/1967 | Ferrie et al. | 219/121 P X |
| 3,597,576 | 8/1971 | Bernard et al. | 219/74 X |

*Primary Examiner*—J. V. Truhe
*Assistant Examiner*—G. R. Peterson
*Attorney, Agent, or Firm*—Young & Thompson

[57] ABSTRACT

Electric welding with a transferred arc plasma between an electrode and the parts to be welded under electric voltage of arc transfer, applicable to the welding in one single pass of metal sheets edge-to-edge having a welding thickness comprised between 7 and 14 mm., with an electrode disposed axially with respect to a discharge nozzle for supplying the plasma-producing gas, the said nozzle comprising a convergent and then divergent frusto-conical portion, and in which said electrode has a conical extremity adapted to project on the downstream side of the neck of said discharge nozzle, the convergent portion of said nozzle having a convergence angle greater by 10° to 80° and preferably by 20° to 60° than the convergence angle of the conical extremity of said electrode.

4 Claims, 2 Drawing Figures

METHOD OF ELECTRIC WELDING BY TRANSFERRED PLASMA AND A WELDING TORCH FOR CARRYING SAID METHOD INTO EFFECT

The present invention relates to electric welding with transferred plasma, in which an arc plasma is formed directly between one electrode of a discharge-nozzle torch delivering the plasma-producing gas and a counter-electrode constituted by the part to be welded.

It is known that welding arc plasmas are obtained by producing the discharge in a gaseous medium of an electric arc subjected to powerful striction or pinching. In this way, there is made available a welding means which has numerous advantages, in particular a large specific heating power, a possibility of choice between various plasma-producing gases and protection gases, a possibility of "keyhole" welding, that is to say with a jet passing right through the part to be welded, and a wide tolerance with respect to considerable variations in length of the arc.

However, this method of welding has only proved really utilizable for the welding of relatively-thin metal sheets. By way of example, it is only possible to weld by this method stainless steel sheets edge-to-edge without chamfer at one pass, and without backing support, with a maximum thickness of the order of 7 mm. Beyond this thickness, the method becomes industrially inoperative. In the laboratory and with particularly critical precautions and certain artifices, it has been possible to go up to 10 and sometimes 12 mm., but these experiments can only be transposed with difficulty to industrial practice.

The object of the present invention relates to improved welding by transferred plasma which has all the advantages referred to above and which makes it further possible to weld industrially, edge-to-edge at one single pass and without backing support, parts having a thickness substantially greater than 7 mm. and which may be up to 14 mm. for stainless steels.

This undoubted improvement has been made possible by means of a careful examination of the manner in which the striction of the plasma is effected. In all the welding heads at present sold commercially, the electrode is fairly widely arranged inside the nozzle, and the latter terminates in a cylindrical channel beyond the neck of a convergent portion of the discharge nozzle. It is this channel which squeezes and constricts the plasma, and this method of procedure, which is almost general, leads by utilizing good cooling of the end portion of the nozzle to the creation of a relatively narrow and powerful jet of transferred plasma.

Now it is known that in order to carry out correctly a welding operation of the plasma type by the method of the keyhole jet, which is practically necessary for the welding of thick sheets without backing supports, it is desirable that the melting zone should have, in a section plane perpendicular to the movement of the part with respect to the jet of plasma, the form of a "wineglass," that is to say having a widely-flared upper portion surmounting a definitely restricted lower portion, which facilitates the rapid solidification of the root and thus constitutes an effective support for the upper portion, still liquid, of the welding bead. The stability of the molten bath is then increased when the height of the flared upper portion is small as compared with the total height of the molten zone.

Experience has shown that the greater the length of the constriction channel, the greater is the penetration effect. On the contrary, the shorter the constriction channel and the more the plasma tends to spread out. Present designs are thus directed in each case to the provision of dimensions of the constriction channel, and especially its length, such that a basic profile of the weld is obtained of the type previously described, and which alone is capable of ensuring a correct weld.

In spite of this, it has never been possible to weld industrially stainless steel sheets of thicknesses greater than 7 mm., since if the length of the channel is increased so as to create a more rigid and more tapered jet of plasma, the penetration power is increased, but the molten zone has a defective shape which favours the collapse of the bath; the operation is then rather related to a simple heat cutting operation, very different from a welding operation. On the other hand, to reduce the length of the channel causes the plasma jet to spread out and forms a bath with a wide upper expansion, to the detriment however of the penetration effect.

In order to resolve this problem of welding of sheets of considerable thicknesses, the Applicants have thought that it would be possible to carry out the striction of the transferred plasma, between two electrodes, not by mechanical methods such as were known in the techniques of plasma welding, but by a method employing solely compressed air.

It has already been proposed to ensure the shaping of a plasma by pneumatic means by causing an electrode extremity to project out of the discharge nozzle, and by choosing a porous material to form an electrode and by introducing the plasma-producing gas through this material. However, this method of creating a plasma column free from any partitioning, was essentially directed to permitting the introduction into this plasma of a fluid flow which carried solid products in particles, established between the electrode and the discharge nozzle for the purpose of transmitting a large amount of heat energy to this fluid and to these particles.

In this proposal, the arc concerned was not of the transferred type but was "blown" beyond a counter-electrode, the sole function of which is to permit the striking and the maintenance of the arc. To attempt to utilize a blown arc of this kind for the edge-to-edge welding of thick sheets would certainly have resulted in failure, and it is the merit of the invention to have discovered that success would be achieved by using such a plasma arc with pneumatic constriction by giving it the characteristics of a transferred arc for the welding of metal sheets having a thickness greater than 7 mm. in a single pass.

In the invention, there is created a gaseous flux of plasma-producing gas, of which an upstream portion is annular around the said electrode, and has a transverse section which is decreased by mechanical means to a minimum section by convergence of its internal and external contours, and a downstream portion beyond the said minimum section, the transverse section of which increases by pneumatic divergence controlled if so desired from its external contour, and the position of the electrode is regulated in such manner that the inception of the arc is located beyond the said convergent portion of the upstream flux.

By abandoning for this technique of welding thick sheets, any mechanical shaping of the plasma, that is to say by arranging the electrode, not in the interior of the convergent portion of a convergent flow of plasma-producing gas, which is followed by a cylindrical portion of mechanically-constricted flux, but on the contrary in a freely divergent portion of the flow of plasma-producing gas, beyond a mechanically-determined convergent portion, and this is effected in such manner that the attachment of the arc to the electrode, that is to say its striking zone, is located in any case level with or beyond the minimum section of transition between the convergent and divergent portion, and on the other hand by eliminating all mechanical arc constriction stress there is ensured a formation of a plasma arc which is particularly suitable for the welding of sheets of considerable thicknesses.

It has been found that if the transverse profile of the welding bead assumed and further improved the conventional and desirable shape of the "wine-glass," as previously specified, on the other hand the longitudinal profile of the front of liquid metal is very different from that of the known art.

In this latter, the front of liquid metal has in cross-section the form of an arm of a V, in which the space between the arms constitutes the zone of penetration of the plasma. In the technique according to the invention, the front of liquid metal has a portion, to the rear with respect to the forward movement of the front which has a large concavity particularly favourable to the equilibrium and maintenance of the molten bath.

In fact, a profile of this kind introduces in time a displacement between the solidification of the root of the welding bead which is effected in the first place, and that of the upper portion of the molten zone, the most massive, which is effected with a slight delay.

It is believed that the appearance of this particular profile results from a dynamic action applied by the plasma-producing gas on the liquid metal. This action would be definitely greater when the technique according to the invention is utilized, and would assist in throwing back, in a particularly effective manner, the heaviest portion of the molten bath. This confers the same advantages as welding in two passes, although there is only a single pass of the plasma torch.

The invention is also directed to a plasma welding torch of the kind comprising an electrode arranged coaxially with a supply nozzle for plasma-producing gas, characterized in that the said discharge nozzle comprises a convergent and then divergent frusto-conical portion, and in that the electrode having an extremity of conical shape projects from the downstream side of the discharge-nozzle neck, the convergent portion of the nozzle having a convergence greater by an angle of 10° to 80°, and preferably of 20° to 60°, than the convergence of the extremity of the electrode.

It has in fact been found surprisingly that the effectiveness of the torch was only ensured by providing a defect of parallelism of the opposite faces of the electrode and of the discharge nozzle at the level of the convergent frusto-conical portions, and by giving the nozzle a more marked convergence than that of the electrode extremity. The absence of this essential condition is so adverse to the quality of the welding that this proves impracticable on an industrial scale.

While ensuring this essential characteristic, the convergences of the nozzle and the electrode extremity may vary within wide limits. Thus, the angle of the convergent portion of the nozzle is comprised between 60° and 120°; similarly, the angle of the conical portion of the electrode extremity is comprised between 30° and 60°.

It should however be also observed that the existence of a divergent portion of the nozzle, which has no action on the constriction of the plasma arc, is essentially motivated by the absolute necessity of avoiding the existence, at the level of the end section of the convergent portion, of local zones of small thickness, such as edges. It is for this reason that the coupling angle of the discharge nozzle between the convergent and divergent portions is comprised between 60° and 130°.

As has already been mentioned, the plasma arc is constricted pneumatically, and it is desirable to prevent any substantial influence of the divergent portion of the nozzle on the shape of the arc plasma. To this end, it will of course be desirable to adapt this shape of divergent portion of the nozzle to the natural form of the plasma which is determined by numerous factors, and in particular by the flow-rate of plasma-producing gas, but in practice, the angle of the divergent portion of the nozzle is comprised between 40° and 120° for flow-rates comprised between 30 and 8 liters per minute. In an application to the welding of thick sheets of more than 7 mm., the current is comprised between 300 and 700 amperes, while for smaller thicknesses below 7 mm., the current may fall to 50 amperes, the voltage of the source being comprised between 15 and 30 volts.

The characteristic features and advantages of the invention will furthermore be brought out in the description which follows below by way of example, reference being made to the accompanying drawings, in which.

Figure 1:
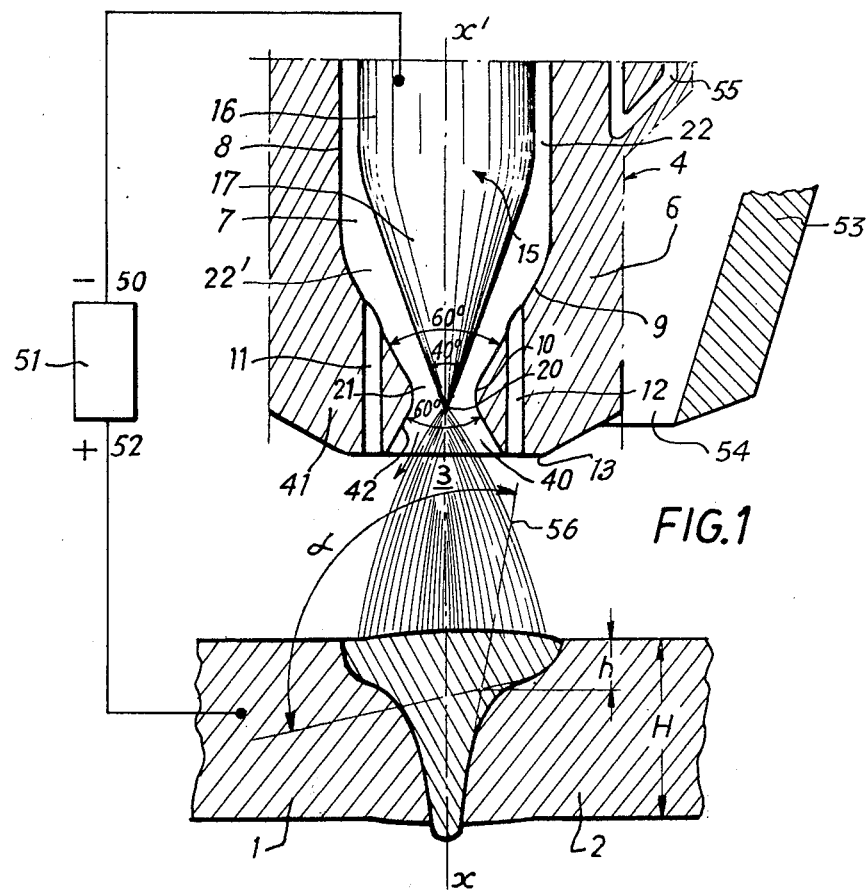
FIG. 1 is a partial view in axial cross-section of a torch in course of welding on two parts placed edge-to-edge, the section plane being perpendicular to the direction of welding of the said edges.

Referring to FIG. 1, a welding torch is utilized for the edge-to-edge welding of two parts 1 and 2 for example of stainless steel, having a thickness of the order of 12 mm. After having put them edge-to-edge along the line $x$-$x'$, the two parts 1 and 2 are subjected to a plasma jet 3, following the technique of "keyhole" welding.

This plasma jet 3 is delivered by a torch 4 having a cavity 7 in which is housed an electrode 15. The cavity 7 is formed by a cylindrical nozzle portion 8 which is followed by a convergent frusto-conical portion 9 terminating in a neck 10 followed by a widely-divergent frusto-conical portion 42. Two lateral channels 11 and 12 are arranged parallel to and on each side of the axis $x$-$x'$ and have their origin in the wall of the convergent portion 9 and opening at the level of a flat front wall 13.

The discharge nozzle 6 comprises at its periphery a sleeve 53 defining an annular conduit 54 for the passage of a protection gas. The nozzle 6 having a relatively-large mass of metal, is powerfully cooled by a fluid circulating in channels, one of which is shown at 55.

The electrode 15 has a cylindrical body portion 16 and a conical end-portion 17. This electrode 15 is connected to the negative pole 50 of a source 51 of electrical energy having a direct-current voltage of the order of 20 to 28 volts and capable of delivering a current of the order of 50 to 700 amperes. The other pole 52 or earth potential of the source 51 is connected to the parts 1 and 2, thus producing a plasma arc 3 of the transferred type. The extremity proper 20 of the electrode 15 necessarily projects beyond the neck 10 of the convergent-divergent discharge nozzle 9, 42.

In the form of embodiment chosen, the diameter of the cylindrical portion 8 is 12 mm. and the conicity of the frusto-conical nozzle portion 9 is 60°, while the diameter of the cylindrical portion 16 of the electrode 15 is 10 mm. and the conicity of the tapered portion 17 is 40°. The opening angle of the divergent portion 42 of the nozzle is 60° and the coupling angle of the nozzle between the convergent portion 9 and the divergent portion 42 is 120°.

The neck 10 has a diameter of 3 mm. and the annular passage 21 formed between the electrode 15 and the nozzle 6 at the level of the neck 10 has a radial extension of 1.5 to 3 mm.

This annular passage 21 connects an upstream annular conduit 22 formed between the cylindrical portions 8 and 16, and then at 22′ between the conical portions 9 and 17 of the discharge nozzle 6 and the electrode 15 on the one hand and a widely divergent conduit 40 formed by the divergent portion 42 of the nozzle 6 on the other. A slight restriction on the upstream side is produced in the conduit 40 by the portion of the electrode 15 which is engaged in the divergent portion 42.

The downstream portion 22′ of the conduit 22 has a transverse section of passage which is progressively reduced simultaneously by the convergence of the conical portions 9 and 17, and also by the more accentuated convergence of the portion 9 (angle of convergence 60°) with respect to that of the portion 17 (angle of convergence 40°).

In operation, a flux of plasma-producing gas, generally with a base of argon or a mixture of argon and hydrogen and/or of helium or other gas, is injected at a flow-rate of 9 to 15 liters per minute. The distance between the extremity 20 of the electrode 15 and the upper plane of the parts 1 and 2 is chosen to be of the order of 10 mm.

This flow of plasma-producing gas in the portion located on the upstream side of the neck 10, that is to say upstream of its minimum section, has an external contour and an internal contour which are closely controlled by the inner wall 8–9 of the nozzle and the wall 16–17 of the electrode 15. On the other hand, beyond this neck 10, the contour of the flux of plasma-producing gas, rapidly transferred as a plasma, which has been shown diagrammatically at 56 is, although itself divergent, more restricted than the wall facing the divergent portion 42 of the nozzle. In this zone, the contour 56 of the plasma 3 is freely determined by purely pneumatic means, by the flux of plasma-producing gas, and if so desired by the shaping jets discharged from the conduits 11 and 12.

The plasma-generating arc necessarily has its origin beyond the convergent portion 9 of the nozzle 4. In fact, the origin zone of this plasma arc 3 is located at a small distance upstream of the extremity 20 of the electrode 15, and the arc of the transferred type terminates naturally at the parts 1 and 2. In all cases, the degree of projection of the electrode 15 beyond the neck 10 is sufficient for the zone of origin of the plasma arc to be located beyond the neck 10 in the divergent portion 42 of the nozzle, or in the limit, in the plane of the neck 10.

The plasma arc 3 which is formed has a shape determined by numerous factors, to the exclusion, as has been seen, of the divergent 42, but it is essentially the initial shape and the flow-rate of the jet of plasma-producing gas passing out through the neck 10 of the convergent nozzle which ensures this formation of the jet of plasma-producing gas.

More particularly, the rigidity of the plasma is all the higher as the amount of projection of the electrode beyond the nozzle neck 10, and/or as the flow-rate of the plasma-producing gas is increased, which enables the rigidity of this arc to be adjusted so as to satisfy the double condition of ensuring a penetrating power at the same time as a good performance of the molten bath without any expulsion of molten metal.

In all cases, care is taken that the divergent portion 42 of the discharge nozzle is always sufficiently open (in the present case its angle is 60°) in order to avoid any mechanical constriction of squeezing of the plasma arc. This divergent portion 42 of the nozzle has the essential purpose of forming a thermal mass capable of evacuating to cooling channels such as 55, the large flow of heat radiated both by the plasma arc and by the molten bath.

In the absence of this mass, for example by eliminating the portion of nozzle located downstream of the plane of the neck 10, there would be obtained a plasma arc of the same shape, but the nozzle would be rapidly damaged at the level of the discharge, which would then be formed at 10 by an edge with an angle of 60°.

Experience has shown that this arrangement is sufficient to ensure a pneumatic constriction of the jet particularly suitable for welding sheets of large thickness. The transferred plasma obtained by pneumatic constriction has a slight spreading of the jet as compared with a plasma with mechanical constriction, while retaining a sufficient penetration force suitable for obtaining a bath of the kind described in the form of a "wine-glass."

This remarkable result is furthermore accompanied by an appreciable additional advantage, since the plasma being formed substantially at the exterior of the discharge nozzle, the main cause of damage constituted especially by the appearance of stray arcs is eliminated.

It has been seen that, in the arrangement described, the angle of convergence of the frusto-conical portion 9 is 60°, while the tapering angle of the electrode 15 is 40°. The two angles may vary within wide limits, of the order of 60° to 120° for the portion 9 of the nozzle, and of the order of 30° to 60° for the electrode. If the angle of the electrode is less than 30°, the electrode is however liable to disintegrate. It is necessary to observe a certain differentiation in the conicity of the convergent portion of the nozzle 9 and the conical end portion 17 of the electrode 15.

In fact, without any clear explanation having been found at the present time, but very probably for reasons of dynamic flow of the plasma-producing gas, the arrangements of welding torches in which the angle of the electrode extremity portion is equal to the angle of convergence of the discharge nozzle or is greater than this latter, which is possible in certain geometrical constructions, have proved to be of poor efficiency or even inoperative in the edge-to-edge welding of thick sheets having thicknesses of the order of 7 to 14 mm.

The radial extension at the level of the neck of the nozzle is itself essentially determined at the same time by the degree of convergence of the electrode extremity and the amount of projection of this electrode beyond the plane of the neck 10, and it is quite clear that as either of these two factors is increased, the more the diameter of the opening must be increased. By way of example, for an electrode having a degree of convergence (or tapering angle) of 40°, if the diameter of the opening is 3 mm., the electrode must project by 1.5 mm. beyond the neck 10.

Similarly, if the diameter of the neck is 3.8 mm. for an electrode with a conicity of 40°, the projection of the electrode beyond the plane of the nozzle neck must be comprised between 1.6 and 1.9 mm. and advantageously of the order of 1.7 mm. This clearly shows that this dimensioning is particularly critical. Generally speaking, experience shows that the diameter of the neck is advantageously comprised between 2.5 and 4 mm., while the amount of projection of the electrode beyond the plane of the neck is comprised between 0.9 and 2 mm.

It will also be noted that the electrical conditions and the gas supply conditions are very different from the usual plasma welding with retracted electrode. In the method of welding according to the invention, applied to metal sheets of 7 to 14 mm. in thickness, the current is of the order of 300 to 700 amperes for a voltage of 20 to 28 volts (for example, 450 amperes for 22 volts in the example described) whereas in conventional welding, the current was only from 50 to 250 amperes for a voltage of 28 to 35 volts when welding sheets of thickness less than 7 mm. at a single pass.

It is thus found that the plasma welding constricted by purely pneumatic methods according to the invention makes it possible to employ considerably higher currents, of the order of twice or even three times those which are usual in the standard methods of plasma welding with a single pass, although the voltage is lower. Such conditions of electric current supply are entirely excluded in these latter cases.

As regards the flow-rate of plasma-producing gas, it has been shown that this is definitely increased, of the order of twice as compared with conventional plasma welding. This is due to the additional action of this gas under the aspect of the pneumatic constriction. A plasma torch of standard type, that is to say with a retracted electrode, when supplied with such a flow-rate, would not enable the welding to be carried out due to excessive lack of flexibility of the arc but can only at the most be used for cutting. This flow-rate is comprised between 8 and 30 liters per minute.

All these parameters must be chosen so as to obtain a configuration of the molten zone which is similar to that shown in FIG. 1; it can be seen that the most appropriate form is that of a "wine-glass," the upper portion of which is supported by a leg which as it rapidly solidifies provides an effective support of the upper still liquid portion of the welding bead.

The stability of the molten bath is therefore increased when the height $h$ of the flared upper portion is small as compared with the height $H$ of the thickness of the sheet.

Figure 2:
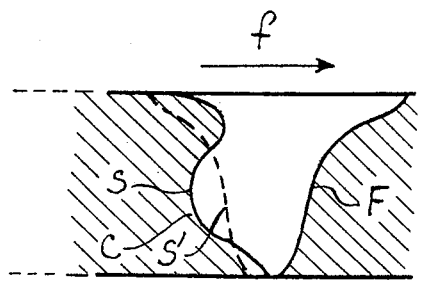
FIG. 2 is a view of the molten bath according to FIG. 1, in cross-section on a plane parallel to the direction of welding of the edges of the two parts.

As indicated in FIG. 2, in a plane parallel to the direction of forward movement of the torch (arrow $f$, FIG. 2) the liquid front S has a cavity C which is characteristic of the method.

In a conventional welding method, the front of liquid metal S' is substantially symmetrical with the melting front F (and this remains unchanged). This shape of liquid front is especially suitable to the maintenance of the molten bath.

By way of example, details are given below of the five following methods of operation:

A — Welding of stainless steels:

| | |
|---|---|
| Discharge nozzle angle | 60° |
| Diameter of the nozzle neck | 8 mm. |
| Electrode diameter | 10 mm. |
| Electrode angle | 40° |
| Electrode projection | 9 mm. |
| Annular gas | 25 l/min. |
| 1) Sheets of 1.5 mm. in thickness | |
| Current | 170 amperes |
| Flow-rate plasma gas (argon) | 8 l/min. |
| 2) Sheets of 12 mm. in thickness | |
| Current | 420 amperes |
| Flow-rate plasma gas (argon) | 15 l/min. |

B — Welding of stainless steels, of 14 mm.

| | |
|---|---|
| Discharge nozzle angle | 60° |
| Diameter of the nozzle neck | 3 mm. |
| Electrode angle | 40° |
| Electrode projection | 1.5 mm. |
| Plasma producing gas | 15 l/min. |
| Annular gas (argon + 10% $H_2$) | 25 l/min. |
| Current | 350 amperes |
| Voltage | 30 volts |

C — Welding of titanium "T 40" of 10 mm. in thickness

| | |
|---|---|
| Welding current | 275 amperes |
| Welding voltage | 24 volts |
| Welding speed | 21 cm./min. |
| Plasma-producing gas (argon) | 14 l/min. |
| Annular gas (argon) | 25 l/min. |
| Electrode projection | 1.5 mm. |

D — Welding mild steels, thickness 6 mm.

| | |
|---|---|
| Welding current | 200 amperes |
| Welding voltage | 22 volts |
| Welding speed | 14.5 cm./min. |
| Plasma-producing gas (argon) | 11 l/min. |
| Annular gas (argon) | 25 l/min. |
| Electrode projection | 1.5 mm. |
| Discharge nozzle diameter | 3 mm. |

E — Welding of copper, thickness 4 mm.

| | |
|---|---|
| Welding current | 200 amperes |
| Welding voltage | 22 volts |
| Welding speed | 12 cm./min. |
| Plasma-producing gas (argon) | 12 l/min. |
| Annular gas (argon 30%, helium 70%) | 24 l/min. |

As has been stated above, the method and the device for welding according to the invention are especially applicable to the welding of thick sheets. It will be understood that these same method and apparatus are also applicable to the welding of sheets of smaller thicknesses, and in a general manner to all the types of welding in the usual field of arc plasma welding.

What we claim is:

1. A plasma welding torch with transferred arc, comprising a discharge nozzle for a plasma producing gas and a nonconsumable electrode disposed axially inside the discharge nozzle, said nozzle having in the direction of gas flow therethrough successively an axially convergent frusto-conical portion and an axially divergent frusto-conical portion the largest end of which constitutes the opening of said nozzle, said convergent and divergent portions of said nozzle meeting in a neck whose diameter is 2.5 mm. – 4 mm., said electrode having an extremity of conical form extending axially along said convergent portion and into said axially divergent portion of said nozzle a distance between 0.9 and 2 mm. from said neck.

2. A plasma welding torch as claimed in claim 1, said convergent portion of said nozzle having a convergence angle greater by 10°–80° than the convergence angle of the conical extremity of said electrode.

3. A plasma welding torch as claimed in claim 1, said convergent portion of said nozzle having a convergence angle greater by 20°–60° than the convergence angle of the conical extremity of said electrode.

4. A plasma welding torch as claimed in claim 1, the angle of said divergent portion of said nozzle being between 40° and 120°.

* * * * *